United States Patent
Vandiver et al.

(10) Patent No.: US 10,534,765 B2
(45) Date of Patent: Jan. 14, 2020

(54) ASSIGNING SEGMENTS OF A SHARED DATABASE STORAGE TO NODES

(71) Applicant: MICRO FOCUS LLC, Santa Clara, CA (US)

(72) Inventors: Benjamin M. Vandiver, Arlington, MA (US); Pratibha Rana, Waltham, MA (US); Pratyush Parimal, Cambridge, MA (US); Jason Michael Slaunwhite, Cambridge, MA (US); Eden Zik, Cambridge, MA (US); Shreya Prasad, Cambridge, MA (US); Seyed Amin Saeidi Nyasar, Cambridge, MA (US); Mark Edward Hayden, Cambridge, MA (US)

(73) Assignee: MICRO FOCUS LLC, Santa Clara, CA (US)

( * ) Notice: Subject to any disclaimer, the term of this patent is extended or adjusted under 35 U.S.C. 154(b) by 230 days.

(21) Appl. No.: 15/482,352

(22) Filed: Apr. 7, 2017

(65) Prior Publication Data
US 2018/0293237 A1    Oct. 11, 2018

(51) Int. Cl.
*G06F 7/00*        (2006.01)
*G06F 16/22*    (2019.01)
*G06F 16/28*    (2019.01)

(52) U.S. Cl.
CPC ...... *G06F 16/2255* (2019.01); *G06F 16/2272* (2019.01); *G06F 16/284* (2019.01)

(58) Field of Classification Search
CPC .. G06F 16/2255; G06F 16/278; G06F 16/284; G06F 16/2272; G06F 9/5066; G06F 12/0873; G06F 17/30917; G06F 2211/1021

USPC ......................... 707/747, 713, 714, 718, 719
See application file for complete search history.

(56) References Cited

U.S. PATENT DOCUMENTS

| | | | |
|---|---|---|---|
| 5,423,037 A | 6/1995 | Hvasshovd | |
| 5,765,159 A * | 6/1998 | Srinivasan | G06F 16/289 |
| 5,842,213 A * | 11/1998 | Odom | G06F 16/289 |
| 5,878,409 A * | 3/1999 | Baru | G06F 16/278 |
| 5,970,495 A * | 10/1999 | Baru | G06F 9/5088 |
| 6,446,092 B1 * | 9/2002 | Sutter | G06F 21/6227 |
| 6,708,179 B1 * | 3/2004 | Arora | G06F 16/24539 |
| 6,957,225 B1 * | 10/2005 | Zait | G06F 16/2264 |
| 7,203,686 B1 * | 4/2007 | Sinclair | G06F 16/2456 |
| 8,386,532 B2 | 2/2013 | Annapragada et al. | |
| 9,047,378 B1 * | 6/2015 | Bakshitz | G06F 16/951 |
| 9,501,550 B2 | 11/2016 | Zhang et al. | |
| 2003/0028551 A1 * | 2/2003 | Sutherland | G06F 16/2453 |
| 2004/0117345 A1 * | 6/2004 | Bamford | G06F 16/27 |

(Continued)

FOREIGN PATENT DOCUMENTS

CN    101996250    3/2011

OTHER PUBLICATIONS

Rahm, E. et al; Analysis of Parallel Scan Processing in Shared Disk Database Systems; http://dbs.uni-leipzig.de/file/stoehr-rahm-europar1995-lncs966.pdf; Retrieved Feb. 15, 2017; 16 pages.

*Primary Examiner* — Mohammed R Uddin

(57) ABSTRACT

A technique includes applying a first mapping to associate a plurality of data records for a plurality of database nodes with a plurality of segments of a storage that is shared by the database nodes; and applying a many-to-many second mapping to associate the segments with the database nodes.

15 Claims, 5 Drawing Sheets

(56) References Cited

U.S. PATENT DOCUMENTS

| | | | |
|---|---|---|---|
| 2006/0195460 A1* | 8/2006 | Nori | G06F 16/252 |
| 2008/0086480 A1* | 4/2008 | Srivastava | G06F 16/27 |
| 2008/0134029 A1* | 6/2008 | Shelton | G06F 16/2428 |
| | | | 715/700 |
| 2010/0106750 A1* | 4/2010 | Melamed | G06F 16/288 |
| | | | 707/803 |
| 2010/0131490 A1* | 5/2010 | Lamb | G06F 16/24542 |
| | | | 707/714 |
| 2011/0055215 A1 | 3/2011 | Uppala | |
| 2011/0302151 A1* | 12/2011 | Abadi | G06F 16/2456 |
| | | | 707/714 |
| 2012/0197868 A1* | 8/2012 | Fauser | G06F 16/183 |
| | | | 707/714 |
| 2012/0310916 A1* | 12/2012 | Abadi | G06F 16/2456 |
| | | | 707/713 |
| 2012/0330908 A1* | 12/2012 | Stowe | G06F 17/00 |
| | | | 707/693 |
| 2013/0205028 A1 | 8/2013 | Crockett et al. | |
| 2014/0280287 A1* | 9/2014 | Ganti | G06F 16/248 |
| | | | 707/766 |
| 2016/0224579 A1 | 8/2016 | Porobic et al. | |
| 2017/0116271 A1* | 4/2017 | Ziauddin | G06F 16/24566 |
| 2017/0308578 A1* | 10/2017 | Chen | G06F 16/284 |

* cited by examiner

ASSIGNING SEGMENTS OF A SHARED DATABASE STORAGE TO NODES

BACKGROUND

A database system allows large volumes of data to be stored, managed and analyzed. Data records for a relational database system may be associated with tables. A table may include one or more rows, where each row may contain a set of related data (e.g., data related to a single entity). The data for the row may be arranged in a series of fields, or columns, where each column includes a particular type of data (e.g., type of characteristic of an entity). Processing nodes of the database system may process queries, which are inquires expressed in a specified format (e.g., a Structured Query Language (SQL) format), for such purposes as analyzing, searching and retrieving data.

DETAILED DESCRIPTION

Figure 1:
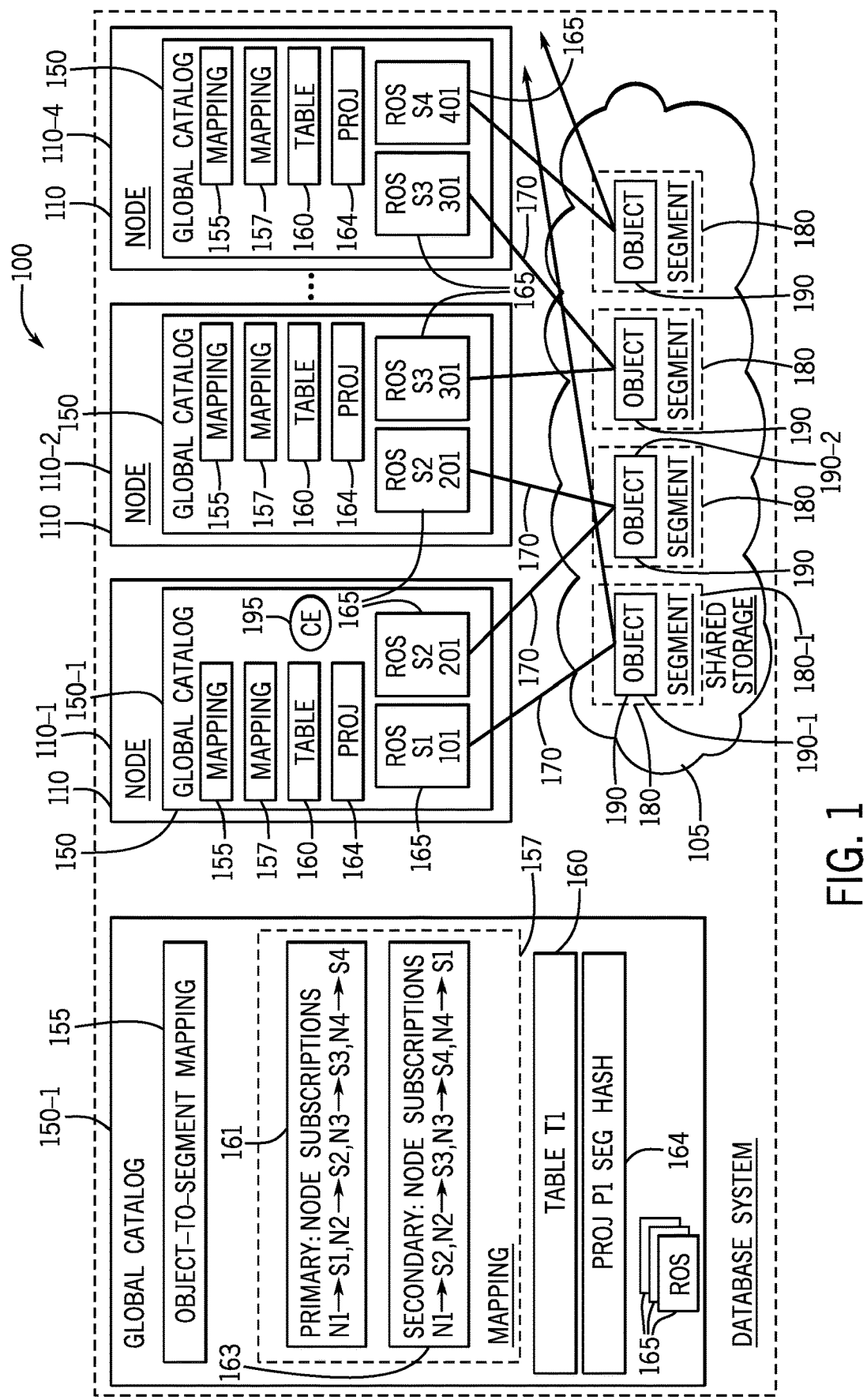
FIG. 1 is a schematic diagram of a database system having a shared storage according to an example implementation.

A database system may include one or multiple nodes that process user requests for database operations (e.g., queries and data load operations) for purposes of accessing, analyzing and managing data that is stored in a storage of the system. In this context, a "node" (also referred to herein as a "database node") refers to a physical machine, such as a physical machine containing a hardware processor (a central processing unit (CPU), one or multiple CPU cores, and so forth). As examples, the node may be a personal computer, a workstation, a server, a rack-mounted computer, a special purpose computer, and so forth.

In general, the database system may process relatively intensive queries, such as, for example, joins that relate data items in one table to another table. For purposes of processing such queries and accommodating the large data volumes that are produced by modern enterprises, the database system may be a distributed system in which multiple individual nodes may be combined in groups called "clusters." In this manner, a given cluster of nodes may collectively process a given query or, in general, collectively perform a database operation.

The database system may have one of many different types of storage depending on the application which the database system serves. For example, a business enterprise may have a database system that is deployed on-site and has direct attached storage. The direct attached storage allows the database system to have a relatively high input/output (I/O) bandwidth and correspondingly be capable of processing queries in an efficient manner. As another option, the database system may be cloud-based, which is a distributed system that allows the number of active nodes to be scaled based on user load. Moreover, the cloud-based database system may store data in a "shared storage," which is a storage that may be shared or accessed by multiple nodes.

Some database operations (e.g., database joins) when performed in a distributed database system that uses a shared storage may be significantly more efficient when the data records operated on by these operations are preplaced in co-located regions of the shared storage (e.g., stored in the same drive or stored in the same memory bank). Although the preplacement of the data records may enhance certain database operations, such preplacement may adversely affect the database system's elasticity, i.e., the ability of the system to easily assign nodes to, and remove nodes from, a given cluster to balance user load. In this manner, adjusting the active node set may involve reshuffling the preplaced data records, and the reshuffling, in turn, may adversely affect system performance.

To enhance the elasticity of a database system that uses shared storage, a data agnostic mechanism may be used in which the data records that are stored in co-located regions of the shared storage are not related to each other. However, with this type of data management, the data records may need to be reshuffled for certain query processing operations (joins, for example), which may adversely affect system performance.

In accordance with example implementations that are described herein, data records are stored in a shared storage of a distributed database system in a manner that may enhance both the system's elasticity and query processing performance. More specifically, in accordance with example implementations, a distributed database system includes a plurality of database nodes that operate on data records that are stored in segments of a shared storage. Moreover, in accordance with example implementations, the database system maintains two mappings: a first mapping, which assigns, or maps, the data records to segments of the shared storage; and a second, many-to-many mapping, which assigns, or maps, the nodes to the segments.

In this context, a "many-to-many mapping" refers to a mapping between two groups of members, such that each member of one of the groups is mapped to multiple members of the other group, and vice versa. In the context of the many-to-many mapping employed by the database system, a given node is mapped, or assigned, to multiple segments of the shared storage; and a given segment of the shared storage is mapped, or assigned, to multiple nodes.

A "segment" refers to a particular unit of the shared storage. As described further herein, in accordance with example implementations, storage locations within the shared storage space may associated with an integer space (i.e., addressed by referencing the integer space); and in accordance with example implementations, a given segment refers to a part of the shared storage between associated upper and lower bounds of the integer space.

In accordance with example implementations, as further described herein, the first mapping, which maps, or assigns, the data records to the segments, relies on a hash function. In this manner, in accordance with example implementations, a hash function may be applied to a key value that is associated with the data record to produce a deterministic value. The hash function, in accordance with example implementations, evenly distributes its output over a hash space, and the segments are uniquely assigned by the first mapping to parts of this hash space. Therefore, in accordance with example implementations, by hashing a key value associated with a data record with the hash function, a portion of the hash space may be identified, and the first mapping assigns this portion to a particular segment. Therefore, the first mapping may be utilized to identify the segment in which the data record is located.

The database system may be a relational database system, and the data records may describe tables. In general, a table may be characterized by a set of attributes, such as column headings, and each column heading may be considered, for example, a "key value." Hashing a given key value, such as a string representing a column heading, for example, with a given hash function produces a unique deterministic value. In this regard, unique key values may map into respective unique hash values of a hash space. The hash space, in turn, may be divided, into separate, contiguous regions, and the database system, in accordance with example implementations, stores data representing a one-to-one mapping between the segments of the shared storage and hash space regions.

Accordingly, due to the segmentation of the data by key value and the second many-to-many segment-to-node mapping, query processing operations that operate on records with a particular key value, such as join and group operations, for example, may find all of the records for these operations on the same node, thereby enhancing query processing efficiently.

For example, a query that joins table T1 on column "a" with table T2 on column "b" may be executed without reshuffling data records, if the data records for table T1 are segmented by "a," the data records for table T2 are segmented by "b," and the key values "a" and "b" map to the same segment of the shared storage and are served by the same database node. As another example, if the database table T1 is segmented by "a," a query that groups by "a" need not reshuffle the data in the shared storage to compute the value of each "a" group. For predictable queries, such as queries that are generated by dash boarding applications, proper segmentation choices for each table may result in relatively high speed query processing performance.

As a more specific example, FIG. 1 depicts a distributed relational database system 100 in accordance with some implementations. Depending on the particular implementation, the database system 100 may be a public cloud-based system, a private cloud-based system, a hybrid-based system (i.e., a system that has public and private cloud components), a private system disposed on site, a private system geographically distributed over multiple locations, and so forth.

The database system 100 may be a scalable system, in accordance with example implementations. In this manner, in accordance with example implementations, processing resources (e.g., the nodes 110 described below) and/or storage resources (e.g., storage devices associated with the shared storage 105 described below) may be scaled according to a user demand, or load, on the database system 100. Moreover, in accordance with example implementations, the database system 100 may selectively group the nodes 110 into clusters, such that a given cluster collectively processes queries.

The database system 100 includes one or multiple nodes (example nodes 110-1, 110-2, ... 110-4, being schematically represented in FIG. 1); and each node 110 may include one or multiple personal computers, work stations, servers, rack-mounted computers, special purpose computers, and so forth. Depending on the particular implementation, the nodes 110 may be located at the same geographical location or may be located at multiple geographical locations. Moreover, in accordance with example implementations, multiple nodes 110 may be rack-mounted computers, such that sets of the nodes 110 may be installed in the same rack.

In accordance with example implementations, the nodes 110 may be coupled to a shared storage 105 through network fabric (not shown in FIG. 1). In general, the network fabric may include components and use protocols that are associated with any type of communication network, such as (as examples) Fibre Channel networks, iSCSI networks, ATA over Ethernet (AoE) networks, HyperSCSI networks, local area networks (LANs), wide area networks (WANs), global networks (e.g., the Internet), or any combination thereof.

The shared storage 105 may include one or multiple physical storage devices that store data using one or multiple storage technologies, such as semiconductor device-based storage, phase change memory-based storage, magnetic material-based storage, memristor-based storage, and so forth. Depending on the particular implementation, the storage devices of the shared storage 105 may be located at the same geographical location or may be located at multiple geographical locations.

Regardless of its particular form, the shared storage 105 stores data records, or objects 190, for the nodes 110. As noted herein, the shared storage 105 may be shared in the sense that the storage 105 is commonly accessible by multiple and different nodes 110 of the database system 100. As depicted by relationships 170 of FIG. 1, a given object 190 that is stored in the shared storage 105 may be shared by multiple nodes 110. For example, FIG. 1 depicts the object 190-2 being shared by nodes 110-1 and 110-2 in that the nodes 110-1 and 110-2 may commonly access the object 190-2 or locally retain a copy of the object 190-2.

The nodes 110 may store data in their local memories (not shown in FIG. 1), and this data may represent global catalogs 150 (the global catalog 150-1 being expanded and depicted in more detail in FIG. 1). The global catalogs 150 provide such information as object states, a first mapping 155 and a second mapping 157 (further described herein) to assign the objects 190 to regions, or segments 180, of the shared storage 105 and assign nodes 110 to the segments 180.

In accordance with example implementations, a given object 190 may be a Read-Optimized Store (ROS) container 165. In this manner, an ROS container 165 may include data representing one or multiple columns for a set of one or multiple rows of a projection 164 in a column format. In this context, a "projection" refers to a selected set of one or multiple columns of a table.

The address space of the shared storage 105 may be divided into the segments 180, and, in accordance with example implementations, each segment 180 may be uniquely associated with a particular region of a hash space. More specifically, in accordance with example implementations, a given object 190 may be stored in a given segment 180 of the shared storage 105, where the segment 180 is associated with a hash space that contains the hash value that is derived by applying a hash function to a key value of the associated projection 164.

For example, referring to the global catalog 150-1 of FIG. 1, the node 110-1, when processing a given query, may operate on a Table T1 160 and produce a projection 164. For this example, the projection 164 is associated with an object 190-1 that is stored in segment 180-1 of the shared storage 105. The node 110-1 may apply a hash function to a key value of the projection 164 to produce a hash value. Using the first mapping 155, the node 110-1 may then identify the segment 180-1 and access the object 190-1 using a storage space address derived from the identified segment 180-1 and the hash value.

In accordance with some implementations, in order to execute a given query, every segment 190 is served by a node 110, and the second mapping 157 is a many-to-many segment-to-node mapping that is used to determine which nodes 110 serve which segments 180. The first mapping 155, in accordance with example implementations, is a one-to-one mapping that is used to determine where data for the given query is located in the shared storage 105.

More specifically, in accordance with example implementations, the segments 180, in aggregate, cover an entire hash space. A row has columns; and a subset of these columns, in accordance with example implementations, forms a "segmentation key value." The segmentation key value may be hashed (i.e., a hash function may be applied to the segmentation key value) to produce a deterministic value. The hash function, in accordance with example implementations, evenly distributes its output (i.e., the corresponding deterministic values) over the hash space (e.g., over a 64 bit integer space, for example). The segment 180 is a region of this hash space. For example, in accordance with some implementations, a given segment 180 may be identified by integers falling between an upper bound and a lower bound on the storage's integer space (i.e., the "hash space," such as, for example, a 64 bit integer space). "Mapping" a row to a segment 180 may be performed, for example, by hashing a segmentation key value and looking up, or retrieving, the hash value in a table (for example) to determine which segment 180 corresponds to that hash value (i.e., to determine which segment 180 has an associated hash space range that contains the hashed, segmentation key value).

In accordance with example implementations, the first mapping 155 is a one-to-one mapping that stores data that represents the assignments of the segments 180 to parts of the hash space. For example, in accordance with some implementations, the first mapping 155 may be a table or other data structure that contains data that, for each segment 180, defines upper and lower boundaries of the hash space to thereby assign the portion of the hash space defined by these boundaries to the segment 180.

In accordance with example implementations, the many-to-many segment-to-node second mapping 157 may include primary node subscriptions 161 and secondary node subscriptions 163. The primary node subscriptions 161, in general, map, or assign, primary responsibilities for the segments 180 to the nodes 110. In this context, a node 110 being "primarily responsible" for a segment 180 means that the node 110 serves the segment 180 when processing a query. A node 110 is "secondarily responsible" for a segment 180 when the node 110 is the next backup for the segment 180 should the segment's assigned primary node fail, become unavailable or otherwise meets some criteria for not serving the segment 180.

For the example of FIG. 1, nodes N1, N2, N3 and N4 may be assigned, via the primary node subscriptions 161, to the segments S1, S2, S3 and S4, respectively. The secondary node subscriptions 163 may assign secondary responsibilities for the segments 180. In this manner, for the example of FIG. 1, the secondary node subscriptions 163 assign responsibilities for the segments S2, S3, S4 and S1 to the nodes N1, N2, N3 and N4, respectively. As such, in accordance with example implementations, assuming that the node 110-1 is the node N1, the node 110-1 may primarily serve the segment S1, and when the node 110-1 is unavailable to serve the segment S1 (such as when the node 110-1 fails or meets some other criteria that offloads serving the segment S1), the segment S1 may be served by the node N2 (the node 110-2, for example).

In accordance with example implementations, a component, such as a clerk engine 195 of the database system 100, may maintain and modify the first mapping 155 and second mapping 157, as well as communicate the corresponding updated versions of the global catalog 150 (containing updated or modified first mapping 155 and second mapping 157, for example) to the nodes 110. For example, the clerk engine 195 may modify data representing the first mapping 155 to assign or reassign certain tables to the same segment 180 to enhance query processing performance. In this manner, in accordance with example implementations, the clerk engine 195 may create or modify the first mapping 155 (by modifying data representing the first mapping 155, for example) to select and store objects 190 that are associated with multiple tables in the same segment 180 for purposes of enhancing query processing associated with these tables (avoiding reshuffling of data in the query processing, for example). Moreover, the clerk engine 195 may modify the second mapping 157 to, for example, add a new node to a cluster. As another example, the clerk engine 195 may modify the second mapping 157 to remove a given node 110 from being responsible (e.g., primary responsibility, secondary responsibility, and so forth) for a given segment 180 if the node 110 has failed or met some other criteria for being removed from being the primary node for the segment 180.

As depicted in FIG. 1, in accordance with some implementations, the clerk engine 195 may be a component of a given node (such as node 110-1 for the example of FIG. 1). However, in accordance with further example implementations, the clerk engine 195 may be a distributed engine that is formed from multiple nodes 110 of the database system 100. In accordance with further example implementations, the clerk engine 195 may associated with maintaining and modifying the global catalog 150 for a group, or cluster, of the nodes 110 (a cluster assigned to process queries as a group, for example). Moreover, in accordance with further example, implementations, the clerk engine 195 may be formed on a node other than a database node 110.

Figure 2:
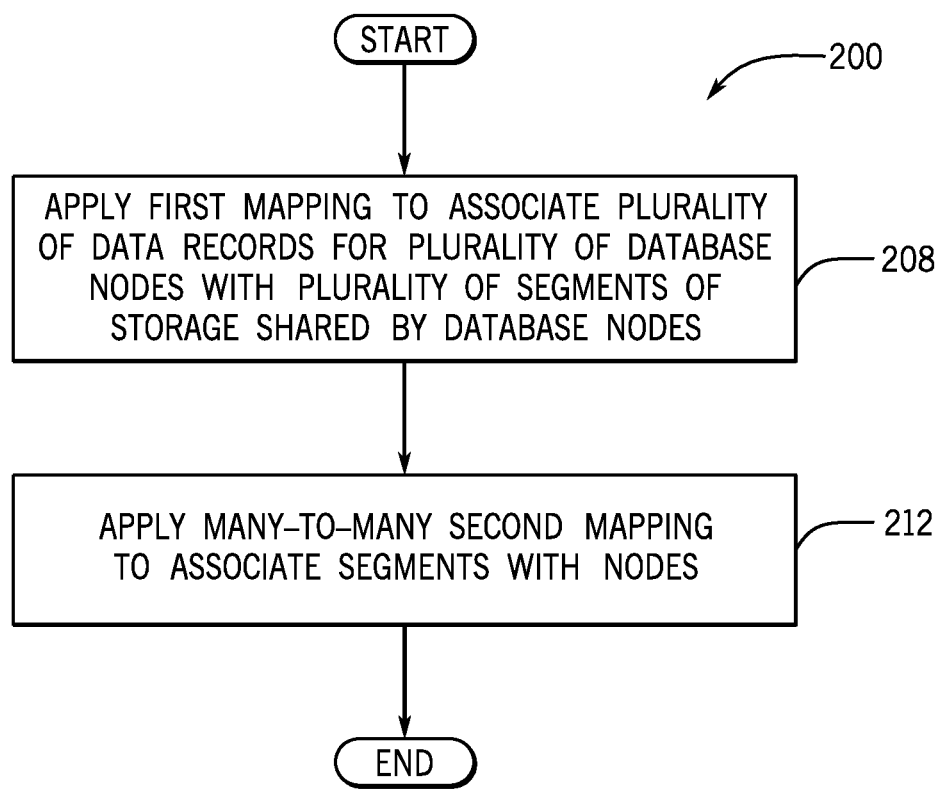
FIGS. 2 and 3 are flow diagrams depicting techniques to associate segments of a shared database storage with nodes according to example implementations.

Referring to FIG. 2 in conjunction with FIG. 1, in accordance with example implementations, a given node 110 may perform a technique 200 for purposes of accessing one or multiple data records, such as the objects 190. In this manner, in accordance with example implementations, a hardware processor (central processing unit (CPU), for example) of the node 110 may execute machine executable instructions that are stored in a non-transitory storage medium (semiconductor-based storage or other storage) of the node 110 for purposes of performing the technique 200. The technique 200 includes applying (block 208) a first mapping to associate a plurality of data records for a plurality of database nodes with a plurality of segments of a storage that is shared by the database nodes. The technique 200 includes applying (block 212) a many-to-many second mapping to associate the plurality of segments with the plurality of database nodes.

Figure 3:
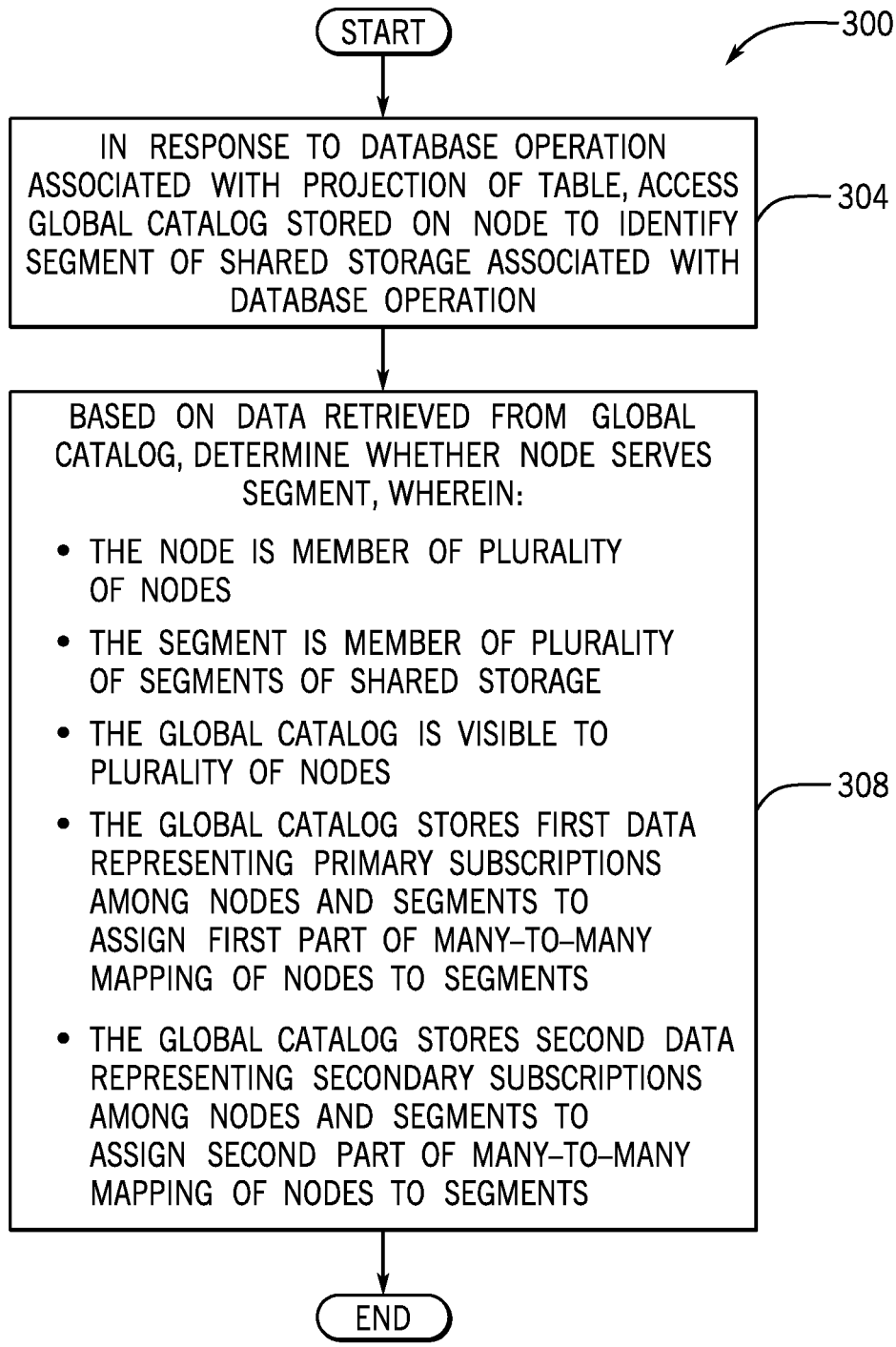

More specifically, referring to FIG. 3 in conjunction with FIG. 1, in accordance with example implementations, a given node 110 of the database 100 may perform a technique 300. The technique 300 includes, in response to a database operation that is associated with a projection of a table, accessing (block 304) a global catalog stored on a node to identify a segment of a shared storage associated with the database operation. The technique 300 includes determining (block 308) whether the node serves the segment based on the data that is retrieved from the global catalog. For this example, the node is a member of a plurality of nodes, the segment is a member of a plurality of segments of the shared storage, the global catalog is visible to the plurality of nodes; the global catalog stores first data representing primary subscriptions among the nodes to assign a first part of a many-to-many mapping of the nodes to the segments; and the global catalog stores second data representing secondary subscriptions among the nodes and the segments to assign a second part of the many-to-many mapping of the nodes to the segments.

Referring back to FIG. 1, in accordance with example implementations, the first mapping 155 and second mapping 157 may have one or more of the following advantages. The first mapping 155 may be used to strategically group data operated on together in the same segment 180, as discussed above. The segment-to-node second mapping 157 may be rapidly adjusted because all of the object data may be stored in the shared storage 105, and not directly on the nodes 110 themselves. A new node 110 may be relatively easily added to the database system 100 by adjusting the mapping to assign a subset of the segments 180 to the new node 110, potentially removing responsibility (a primary responsibility, a secondary responsibility, or both) of the segments 180 from pre-existing node assignments. Queries may immediately use the new node 110, as no expensive redistribution mechanism over all records is used. Instead, a new node 110 may be operable to access assigned segments 190 and service queries through updates and modifications to the second mapping 157, i.e., without having to rearrange, or shuffle, the data objects 190 that are stored in the shared storage 105. Filling a cold cache, in general, takes work that is proportional to the active working set as opposed to the entire dataset that may be conceivably served by the node 110. Removing a node 110 may involve ensuring that any segment 180 served by the node 110 that is removed is also served by another node 110, e.g., via mapping updates to the second mapping 157.

The features that are described herein may support database system operations with increased availability and reduced errors. In general, duplicating responsibility for each segment 180 across multiple nodes 110 improves availability. When a primarily responsible node 110 fails, other nodes 110 may, in accordance with example implementations, immediately serve any segments 180 for which the failed node 110 was primarily responsible without the use of a repair operation. In accordance with example implementations, the secondary node subscriptions 163 may provide a backup mechanism by which database operations may be serviced by one or multiple other nodes when a given primarily responsible node 110 fails. In accordance with example implementations, third, fourth or deeper levels of subscription may be further included in the second mapping 157, depending on a desired level of node backup availability. For example, when a secondarily responsible node 110 fails, another collection of nodes 110 may, in accordance with example implementations, immediately serve any segments 180 for which the failed node 110 was secondarily responsible without the use of a repair operation. When a node 110 is removed from a given cluster and rejoins the cluster, the procedure may be similar to the one used for a new node 110 being added, excepting a possibly warm cache. Once again, no data repair may be used, so a node rejoin, in accordance with example implementations, is non-disruptive to query processing.

Duplicating responsibility for each segment across multiple nodes 110, in accordance with example implementations, may improve query throughput. By running each query on a subset of the available nodes 110, adding additional nodes 110 may result in more concurrent queries on the system 100 as a whole. For example, where there are twice as many nodes 110 as segments 180, two clusters, may effectively run queries independently. Even with non-integral multiples of the segment count of nodes 110, a linear scale-out may be achieved when each node 110 may concurrently process queries equal to the number of objects 190.

Thus, among the potential advantages of the segmentation and mappings described herein, relatively high query processing performance on data that is stored in a shared storage-based database system may be achieved, while retaining elasticity.

Figure 4:
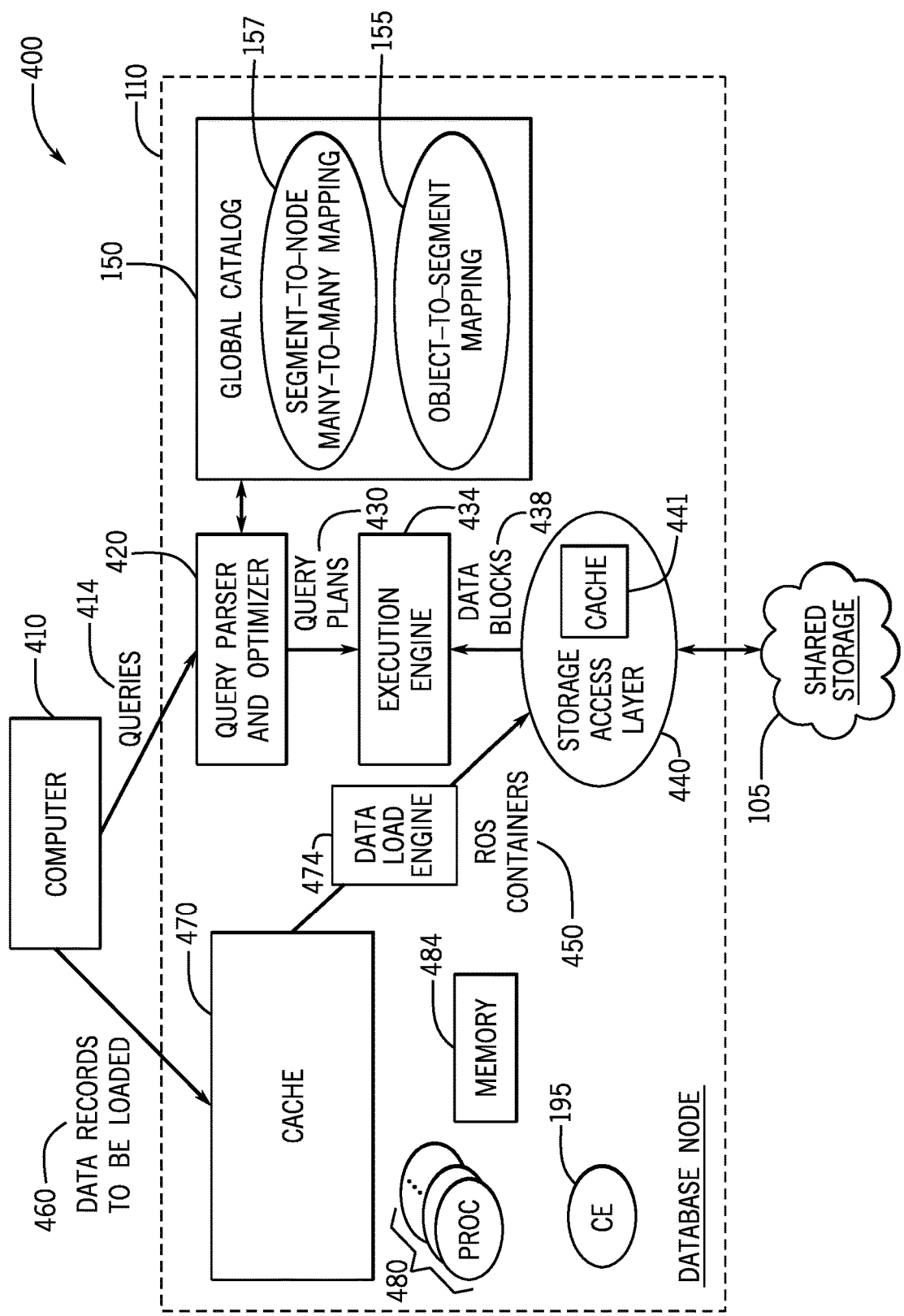
FIG. 4 is an example database environment according to an example implementation.

Referring to FIG. 4, in accordance with example implementations, a given database node 110 may operate in an environment 400 as follows. In particular, the database node 110 may receive data representing database operations that are submitted by one or multiple users through, for example, one or multiple computers 410. The computer 410 may communicate with the database system 100 via network fabric (not depicted in FIG. 4). For the example depicted in FIG. 4, the computer 410 may submit one or multiple queries 414 and one or multiple data records 460 in associated load operations to the database system 100.

The queries 414 may be, in accordance with example implementations, parsed by a query parser and optimizer 420 of the node 110. In general, the query parser and optimizer 420 may consult the global catalog 150, and in particular, the first mapping 155 and second mapping 157, for purposes of determining the nodes to serve the query, the mappings between the nodes and segments of the shared storage 105, and so forth. The query parser and optimizer 420 develops a corresponding query plan 430 for a given query 414, which is provided to an execution engine 434 of the node 110. The execution engine 434, in turn, causes a storage access layer 440 of the node 110 to access the shared storage 105 and provide corresponding data blocks 438 back to the execution engine 434 in response to the executed query plan 430. As depicted in FIG. 4, in accordance with example implementations, the storage access layer 440 may include a cache 441 to cache the read data.

In accordance with example implementations, the database node 110 may further include a write cache 470 that caches the data records 460 received by the node 110 associated with corresponding data load operations. Moreover, a data loading engine 474 of the node 110 may read data from the write cache 470 and rearrange the data into ROS containers 450 that are provided to the storage access layer 440 for purposes of storing the ROS containers 450 in the appropriate segments of the shared storage 105. For this purpose, the storage access layer 440 may consult the first mapping 155 and second mapping 157 of the global catalog 150, as described herein.

In accordance with example implementations, the node 110 may include one or multiple physical hardware processors 480, such as one or multiple central processing units (CPUs), one or multiple CPU cores, and so forth. Moreover, the database node 110 may include a local memory 484. In general, the memory 484 is a non-transitory memory that may be formed from, as examples, semiconductor storage devices, phase change storage devices, magnetic storage devices, memristor-based devices, a combination of storage devices associated with multiple storage technologies, and so forth. Regardless of its particular form, the memory 484 may store various data (data representing the global catalog 150, data representing parameters used by the components of the node 110, and so forth) as well as instructions that, when executed by the processor(s) 480, cause the processor(s) 480 to form one or multiple components of the database node, such as, for example, the query parser and optimizer 420, the execution engine 434, the storage access layer 440, the data loading engine 474, and so forth. In accordance with example implementations, the memory 484 may store machine executable instructions that, when executed by the processor(s) 480, cause the processor(s) 480 to apply the first mapping 155 to associate a plurality of data records for a plurality of database nodes with a plurality of segments of a storage shared by the database nodes; and applying the second mapping 157 to associate the segments with the database nodes.

Moreover, FIG. 4 depicts the clerk engine 195 being formed on node 110. The clerk engine 195, in accordance with example implementations, may be formed by one or multiple processors 480 executing instructions stored in the memory 484 to cause the processor(s) to maintain or update the global catalog 150; maintain or update the first mapping 155 and the second mapping 157; communicate changes in the first mapping 155 and the second mapping 157 to the nodes 110; communicate changes or versions of the global catalog 150 to the nodes 110; and so forth.

in accordance with further example implementations, one or multiple components of the node 110 (such as the clerk engine 195, the execution engine 434 the query parser and optimizer 420, and so forth) may be formed from dedicated hardware that is constructed to perform one or multiple specific functions, such as a field programmable gate array (FPGA), an Application Specific Integrated Circuit (ASIC), and so forth.

Figure 5:
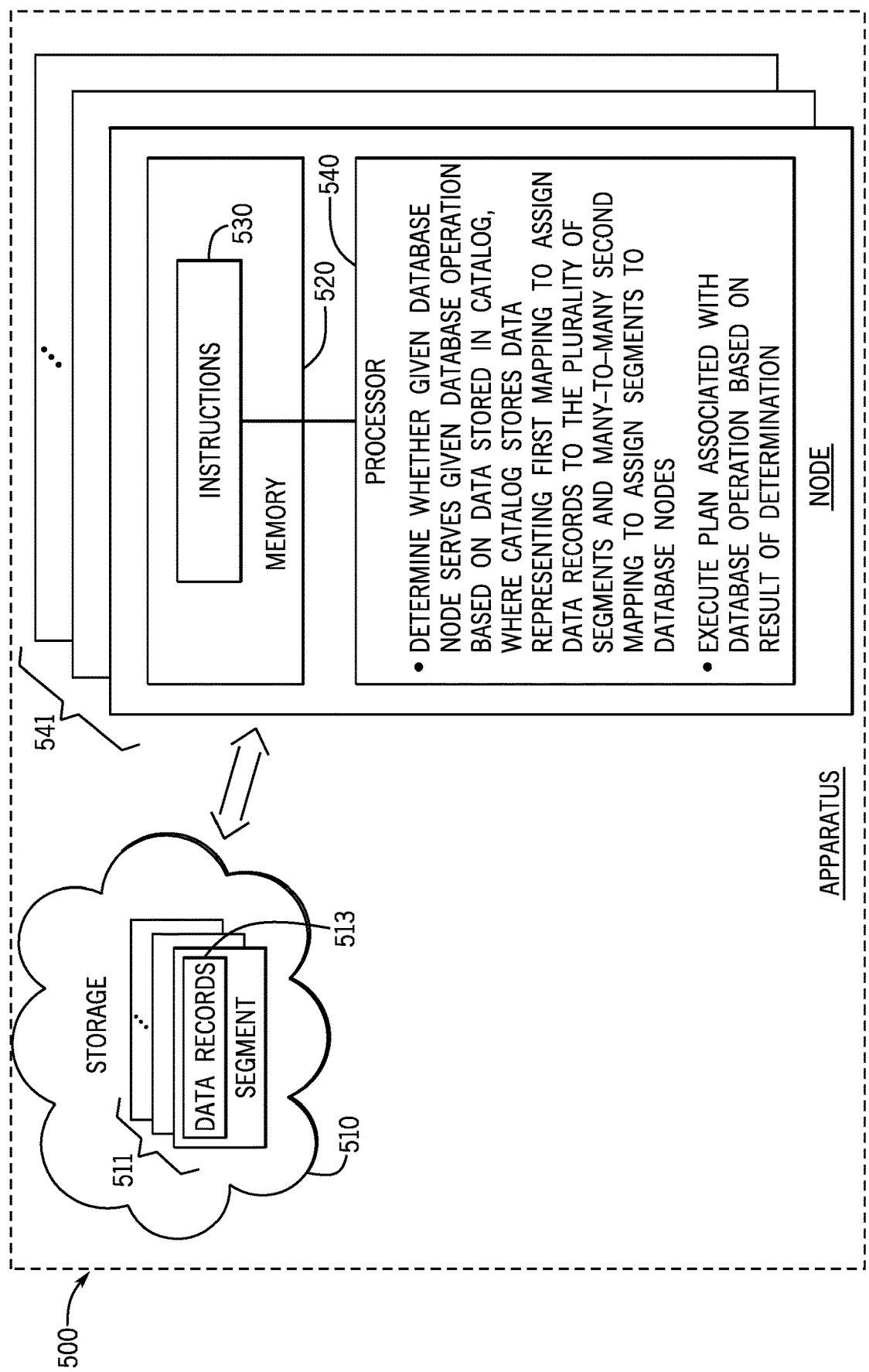
FIG. 5 is a schematic diagram of an apparatus to use a segmented and shared database storage according to an example implementation.

Referring to FIG. 5, in accordance with example implementations, an apparatus 500 includes a storage 510 to store data records 513. The storage 510 includes a plurality of segments 511. The apparatus 500 includes a plurality of database nodes 541, where the plurality of database nodes 541 share the storage 510, and a given database node 541 of the plurality of database nodes 541 includes a processor 540 and a memory 520. The memory 520 stores instructions 530 that when executed by the processor 540 cause the processor 540 to determine whether the given database node serves a given database operation based on data stored in a catalog. The catalog stores data representing a first mapping to assign the data records to the plurality of segments and a many-to-many second mapping to assign the segments to the database nodes. The instructions 530 when executed by the processor 540 causes the processor 540 to execute a plan associated with the database operation based on a result of the determination.

While the present disclosure has been described with respect to a limited number of embodiments, those skilled in the art, having the benefit of this disclosure, will appreciate numerous modifications and variations therefrom. It is intended that the appended claims cover all such modifications and variations.

What is claimed is:

1. A method comprising:
   applying a first mapping to associate a plurality of data records for a plurality of database nodes with a plurality of segments of a storage shared by the plurality of database nodes, wherein applying the first mapping comprises, for a given data record of the plurality of data records, associating the given data record to a given segment of the plurality of segments based on a key value associated with the given data record; and
   applying a many-to-many second mapping to associate the plurality of segments with the plurality of database nodes, including assigning primary responsibility for the given segment to a first node of the plurality of database nodes in processing a first query and assigning secondary responsibility for the given segment to a second node of the plurality of database nodes as backup should the first node become unavailable.

2. The method of claim 1, wherein the given data record is associated with a column of a table, and the key value represents an attribute of the column.

3. The method of claim 1, wherein associating the given data record to the given segment comprises applying a hash function based on the key value to generate a hash value associated with the given segment.

4. The method of claim 1, further comprising adding another database node to the plurality of database nodes, comprising:
   modifying the many-to-many second mapping to allocate a subset of segments of the plurality of segments to add the another database node.

5. The method of claim 4, wherein adding the another database node to the plurality of database nodes further comprises:
   modifying the many-to-many second mapping to remove allocation of at least one segment of the plurality of segments from a database node of the plurality of database nodes.

6. The method of claim 1, wherein the many-to-many second mapping allocates multiple database nodes of the plurality of database nodes to a second given segment of the plurality of segments, the method further comprising:
   using a first database node of the multiple database nodes to process a second query involving a second given data record of the plurality of data records assigned to the second given segment; and
   using a second node of the multiple database nodes to process a third query involving the second given data record assigned to the second given segment independently from the processing of the second query.

7. An article comprising a non-transitory computer readable storage medium storing instructions that when executed by a node cause the node to:
   in response to a database operation associated with a projection of a table, access a global catalog stored on the node to identify a segment of a plurality of segments of a shared storage associated with the database operation;
   determine a hash value associated with a key value associated with the projection;
   identify the segment of the shared storage associated with the database operation based on the hash value; and
   based on data retrieved from the global catalog, determine whether the node serves the segment,
   wherein:
      the node is a member of a plurality of nodes;
      the global catalog is visible to the plurality of nodes;
      the global catalog stores first data representing primary subscriptions among the plurality of nodes to assign a first part of a many-to-many mapping of the plurality of nodes to the plurality of segments, wherein the primary subscriptions include assigning primary responsibility to a primary node of the plurality of nodes in processing a query; and
      the global catalog stores second data representing secondary subscriptions among the plurality of nodes and the plurality of segments to assign a second part of the many-to-many mapping of the plurality of nodes to the plurality of segments, wherein the secondary subscriptions include assigning secondary responsibility to a secondary node of the plurality of nodes as backup should the primary node become unavailable.

8. The article of claim 7, the storage medium to store instructions that when executed by the node cause the node to modify at least one of the primary subscriptions or the secondary subscriptions in response to another node of the plurality of nodes failing.

9. The article of claim 7, wherein the plurality of nodes are part of a cluster of nodes, and the storage medium to store instructions that when executed by the node cause the node to modify at least one of the primary subscriptions or the secondary subscriptions in response to another node being added to the cluster.

10. An apparatus comprising:
a storage to store data records, wherein the storage comprises a plurality of segments;
a plurality of database nodes, wherein the plurality of database nodes share the storage, and a given database node of the plurality of database nodes comprises a processor and a memory storing instructions that when executed by the processor cause the processor to:
determine whether the given database node serves a given database operation based on data stored in a catalog, wherein the catalog stores data representing:
a first mapping to assign the data records to the plurality of segments;
a many-to-many second mapping to assign the plurality of segments to the plurality of database nodes;
data representing primary subscriptions among the plurality of database nodes to assign primary responsibilities for the plurality of segments onto the plurality of database nodes; and
data representing secondary subscriptions to assign secondary responsibilities for the plurality of segments to the plurality of database nodes;
generate a hash of a key value associated with the given database operation to identify a segment of the plurality of segments assigned to a hash space associated with the segment; and
execute a plan associated with the given database operation based on a result of the determination.

11. The apparatus of claim 10, wherein the many-to-many second mapping assigns multiple nodes of the plurality of database nodes to a given segment of the plurality of segments and assigns multiple segments of the plurality of segments to a database node of the plurality of database nodes.

12. The apparatus of claim 10, wherein:
the data records comprise read optimized storage containers, wherein each read optimized storage container is associated with a projection; and
the instructions when executed by the processor causes the processor to generate hashes based on the projections, and use the hashes based on the projections and the first mapping to identify the plurality of segments.

13. The apparatus of claim 10, wherein the plurality of database nodes are part of a cluster of database nodes and the processor modifies the many-to-many second mapping in response to at least one of a database node being added to the cluster or a database node of the cluster failing.

14. The apparatus of claim 10, wherein the data records represent a plurality of tables, and the first mapping assigns a subset of tables of the plurality of tables to a given segment of the plurality of segments.

15. The apparatus of claim 10, wherein the catalog comprises a global catalog stored on each of the database nodes.

* * * * *